Patented Apr. 21, 1936

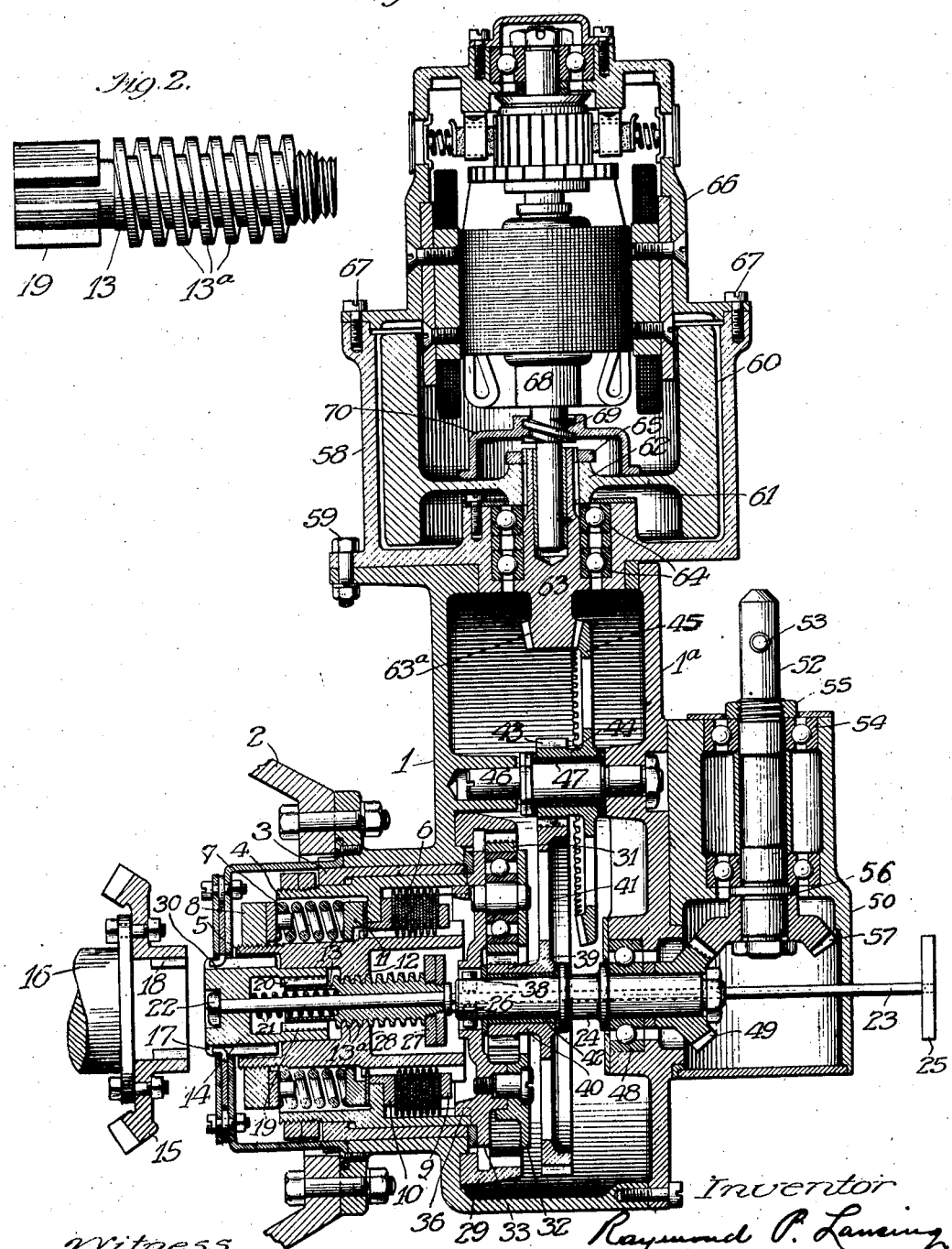

2,038,181

UNITED STATES PATENT OFFICE 2,038,181

ENGINE STARTER

Raymond P. Lansing, Montclair, N. J., assignor to Eclipse Machine Company, Elmira, N. Y., a corporation of New York Application February 6, 1926, Serial No. 86,414
Renewed October 6, 1933

22 Claims. (Cl. 123—179)

My invention relates to engine starting apparatus for the starting of engines such as internal combustion engines and more particularly, but not necessarily, airplane engines and the object thereof is to provide a simple, efficient, and reliable apparatus for either manual or power operation or both, and provided with inertia means such as a flywheel which is actuated by such power means or manual means for the accumulation and storing of energy which is thereupon utilized by the application thereof to the engine for cranking the same; and also preferably provided with means for disconnecting the power means such as an electric motor when the manual means are operated, such apparatus being characterized by the provision of automatic means, such as a screw threaded control of the driving member, which engages the engine member for predetermining the dwell or interval of time required for the speeding up of the flywheel before the connection is made between such driving member and the engine member.

In the drawing Fig. 1 is a vertical section of an apparatus embodying my invention but taken on an irregular line in order to show the manual means in its horizontal section; Fig. 2 is a detailed view of one of the sections of the driving member.

My apparatus comprises a transmission or drive having a driving member adapted to engage a member of the engine to be started, reduction means such as gearing, an inertia means such as a flywheel operatively connected therewith, and manual means operatively connected with such gearing and also power means such as an electric motor operatively connected with the inertia means and the gearing. As herein shown and by preference the power means and the manual means may be combined in the same apparatus and may be used separately or conjointly if desired, and moreover one or the other thereof may be dispensed with whereupon the apparatus would be operated either wholly by power means or wholly by manual means.

First describing the drive proper the same is located within the main casing 1 which is suitably supported as by being detachably connected with the crank case 2 of the engine, a small portion of which is illustrated. Within a bushing 3 in the casing there rotates a driving barrel 4 and a shell or nut 5 concentrically arranged therewithin and providing a considerable annular space between them to receive a yieldable drive connection which is here in the form of a friction clutch 6. This clutch is composed of two sets of plates which are splined respectively to the interior of the barrel and exterior of the shell. The proper pressure for the plates is provided by a series of springs 7 located in such annular space and such pressure is regulated by the adjustable nut 8 screwing onto the outer end of the shell or nut 5. The thrust of these springs tends to force the shell outwardly whereby the ring 9 clamps the plates together by forcing them against the ring 10 which bears against the annular internal flange 11 within the nut. Jointly the barrel, shell and interposed friction clutch form a desirable actuating means—sufficiently positive, yet capable of slippage to yield under undue strain—for the driving member to be described. The shell or nut 5 is provided with rather fine threads 12 in which is threaded a screw shaft 13 which has rather fine corresponding threads 13ª, to form an operating connection. This shaft 13 constitutes one of the main parts or sections of the driving member whose other principal section is a clutch member 14 which is adapted to engage a member of the engine to be started such as the corresponding clutch element 15 forming a part of or secured to a rotatable part of the engine such as the crank shaft 16 thereof. The clutch member 14 is provided with peripheral grooves and splines 17 adapted to engage the complementary grooves and splines 18 of the engine member. The clutch member 14 is mounted on the outer end of the screw shaft 13 for longitudinal movement relative thereto and also for rotary movement therewith, and in the present instance such mounting being by means of the splines 19 on the screw shaft cooperating with corresponding splines and grooves 20 in the bore at the inner end of the clutch member 14. The two sections of the driving member are held extended in the normal position shown in Fig. 1 by the spring 21 and such extension is limited by the head 22 of a rod 23 which passes through the clutch member 14 and through a central bore in the screw shaft in which it is secured, and also centrally through the main shaft 24 of the reduction gearing, such rod being a manually operated rod terminating in a handle 25 at a point exterior of the apparatus and in the present instance being located adjacent the interior of the casing of the manually operated means. This rod 23 is provided near its end adjacent the screw shaft with a flange 26 normally bearing against the inner end of the screw shaft. This end of the screw shaft is provided with two nuts 27, the one nearest the end of such shaft being the lock nut and the other serving as a stop for the outward movement of the screw shaft by contact against the internal shoulder 28 within the nut 5. The rod 23 is suitably connected with the driving member as to be movable rotarially therewith and longitudinally thereof. In the present instance, the head 22 is angular and fits in an angular socket in the clutch member 14, whereby the rod may rotate it.

Next referring to the reduction gearing the same is contained within the main casing 1 and cover plate 1ᵃ by which such gearing is supported and in which it has its bearings. A stationary internal gear 29 is secured to the casing 1 and with the same meshes a series of three planetary pinions 31 which are journaled between two parallel plates 32 and 33. These plates are spaced apart and form a frame for said pinions. The inner plate 33 is connected with the barrel 4 in suitable manner as by being splined thereto at 36 and such plate has a hub provided with longitudinal grooves adapted to receive oppositely extending projections or pins 38 at the left hand end of shaft 24, Fig. 1, whereby such shaft and plate are detachably connected and the shaft is adapted to drive the plate and its attached gearing.

The pinions 31 mesh with a central pinion 39 which as shown and by preference is formed as a part of the hub 40 of a gear 41 mounted to rotate freely upon shaft 24 through bushing 42. This gear 41 meshes with a pinion 43 which as shown and by preference is formed upon the hub 44 of a bevel gear 45 which is mounted to rotate freely upon the shaft 46 through a bushing 47.

The right hand end of shaft 24, Fig. 1, is journaled in bearings 48 in casing plate 1ᵃ and extends therethrough and to such projecting end a beveled pinion 49 is secured. This pinion forms a part of the manual means and the same extends into a small casing 50 secured in suitable manner to plate 1ᵃ, the same being in practice positioned at right angles to the position shown in Fig. 1. The manual means also comprises a cranking shaft 52 extending exteriorly of casing 50 and thereat provided with suitable means such as pins 53 for engagement with an ordinary hand crank. This shaft 52 is provided at its inner end with a beveled pinion 57 meshing with a corresponding pinion 49.

Describing the inertia means the same comprises a flywheel and operating connections with the beveled gear 45 and with the prime mover which is here an electric motor, such inertia means being contained within and supported by a casing 58 which is secured to casing 1 in suitable manner as by the screws 59. The flywheel comprises a rim 60 having the predetermined or desired mass or weight, a web 61 and a hub 62. This hub is drivingly secured as by splining to a vertical shaft 63 which is journaled in bearings 64 in the casing 58 and provided at its lower end with a beveled pinion 63ᵃ meshing with gear 45. The flywheel is held in proper position on shaft 63 and with respect to its bearings by the nut 65. The electric motor 66 is detachably secured to the casing 58 by screws 67 and its armature shaft 68 is extended at its lower end and has its bearing in a socket formed in the upper end of the shaft 63. Intermediate its length the armature shaft is provided with a screw threaded portion 69 on which is threaded a clamping member in the form of a cup or shell 70, the margins of which cup are adapted to engage and clamp the web 61 of the flywheel. The direction of the screw threads is such that when the motor is energized and is therefore the driver the shell 70 will become clamped upon the flywheel and form the driving connection between the motor armature and such flywheel.

Describing a cycle of operation of the apparatus and beginning with the utilization of the electric motor as the source of energy and with the parts in their normal position as shown in Fig. 1 in which the clutch elements 14 and 15 are disengaged, when the motor is energized the shaft 63 will be rapidly rotated through the clamping member 70 which is adapted to transmit torque in one direction only, in the present instance from the motor to the shaft 63 and thence to the succeeding elements in the train of operating connections. The flywheel is consequently rapidly rotated and the drive proper will be comparatively slowly rotated by reason of the reduction gearing with the result that the nut 5 will be rotated. As this nut is in a fixed position with relation to longitudinal movement and the same is threaded to the screw shaft, such shaft will be screwed outwardly towards the engine member. However, owing to the fact that these screw threads are comparatively fine as compared with long lead threads the advance movement of the screw shaft and its clutch member 14 towards the engine member will be comparatively slow and will take a predetermined interval of delay. This will give the time dependent upon the speed of rotation of the flywheel or dwell required by the motor for the speeding up of the flywheel to the desired figure of R. P. M. which in practice is from 15,000 to 20,000. When the desired R. P. M. of the flywheel is reached the driving member of the drive will be in engagement with the engine member and the engine will thereupon be cranked. It will be understood that the driving member is held against rotation before its engagement with the engine member so as to insure longitudinal movement thereof for which purpose I provide the splines 30 engaging the internally splined annular plate of the clutch member 14, the plate 30 being rotatable in unison with the clutch member 14 after the latter has reached the limit of its longitudinal movement, such rotation being relative to a stationary annular disc which is secured to the outer cap of the casing by suitable screws as indicated in Fig. 1. The frictional contact between the fixed annular disc just referred to and the splined plate 30 is sufficient to resist rotation of said plate, so long as the clutch member 14 is free to move forward along the splines 18 of the engine member 15.

When the engine starts on its own power the driving member will be automatically withdrawn from engagement by the screw action between the screw shaft and its nut, but the withdrawing action will be prolonged beyond the usual demeshing period because of the above-described fineness of the threads. In other words, it will require more than a mere temporary overrun of engine engaging member 14, to effect complete de-meshing thereof, as the drive from the member 60 continues during and after such momentary overrun, and until the engine firing becomes sufficiently sustained to make further cranking unnecessary.

Next describing the manual means as the source of power, a hand crank is applied to the cranking shaft 52 and rotated by the operator until the flywheel reaches the desired or predetermined R. P. M. In this operation the torque is transmitted from shaft 52 through pinions 57 and 49 to shaft 24 and thence through the frame of the planetary pinions 31 to gears 41 and 45 and thence to shaft 63 and finally to flywheel 60. In this operation the torque is not transmitted to the motor but such motor is disconnected from shaft 63 and it will thereupon remain idle.

If some particular operation of the apparatus should take longer than the contemplated time, in which event the engagement of the driving member with the engine member might occur too soon, that is before the flywheel has attained its desired or predetermined speed of rotation, such engagement may be delayed further and to the proper moment by the act of the operator pulling out the rod 23, thereby drawing the clutch member 14 to the right and sliding it upon the screw shaft. Then, at the proper moment, that is when the desired flywheel speed has been attained, the operator will let go the rod 23 whereupon the clutch member 14 will snap into engagement with the engine member and the engine will be cranked in the manner already explained, such snap action being produced by the force of the spring 21 which is compressed to a certain extent by the aforesaid sliding action of the clutch member 14 in response to the pull exerted upon the rod 23.

If the engine should fail to start after engagement and cranking by the driving member and the latter is left in engagement, that is such driving member has not been disengaged, the clutch member 14 is first withdrawn from engagement by the act of the operator pulling out the rod 23 and then rotating the same whereby the entire driving member will be rotated to restore the same through the screw action to normal position ready for the next starting operation. It will be understood that the rod 23 is capable of rotating the clutch member 14 and thereby the screw shaft through the angular connection between its head 22 and such clutch member and the splined connection between the latter and the screw shaft.

I claim:

1. In an engine starting apparatus, a drive including actuating means and a driving member adapted to be automatically advanced into engagement with a member of the engine to be started when the actuating means are operated, an inertia means cooperating with the actuating means, driving means for the inertia means, and means for predetermining the period of time of the advancement of the driving member before engaging the engine member the period of time varying in accordance with the speed of rotation of the inertia means, whereby the inertia means may be operated sufficiently before such engagement occurs said driving member having the portion which engages the engine member movable for advancement independently of the remainder of such driving member, and means for controlling such portion to increase such period of time.

2. In an engine starting apparatus, a drive including actuating means and a driving member adapted to be automatically advanced into engagement with a member of the engine to be started when the actuating means are operated, an inertia means cooperating with the actuating means, driving means for the inertia means, and means for predetermining the period of time of the advancement of the driving member before engaging the engine member, in accordance with the speed of rotation of the inertia means, whereby the inertia means may be operated sufficiently before such engagement occurs, said driving member having the portion which engages the engine member movable for advancement independently of the remainder of such driving member, and a manually operated rod for controlling such portion to increase such period of time.

3. In an engine starting apparatus, a drive including actuating means and a driving member adapted to be automatically advanced into engagement with a member of the engine to be started when the actuating means are operated, an inertia means cooperating with the actuating means, driving means for the inertia means, and means for predetermining the period of time of the advancement of the driving member before engaging the engine member in accordance with the speed of rotation of the inertia means, whereby the inertia means may be operated sufficiently before such engagement occurs, said driving member having the portion which engages the engine member movable for advancement independently of the remainder of such driving member, and means for controlling such portion to increase such period of time, said driving member comprising a body portion and a clutch portion mounted thereon for rotary movement therewith and longitudinal movement thereof, and means for restraining longitudinal movement of the clutch portion during the longitudinal movement of the body portion in order to increase such period of time.

4. In an engine starting apparatus, a drive including actuating means and a driving member adapted to be automatically advanced into engagement with a member of the engine to be started when the actuating means are operated, an inertia means cooperating with the actuating means, driving means for the inertia means, and means for predetermining the period of time of the advancement of the driving member before engaging the engine member the period of time varying in accordance with the speed of the inertia means, whereby the inertia means may be operated sufficiently before such engagement occurs, said driving member having the portion which engages the engine member movable for advancement independently of the remainder of such driving member, and means for controlling such portion to increase such period of time, said driving member comprising a body portion and a clutch portion mounted thereon for rotary movement therewith and longitudinal movement thereof, and a manually operated rod for controlling the longitudinal movement of the clutch portion in order to increase such period of time.

5. In an engine starting apparatus, a drive including actuating means and a driving member adapted to be automatically advanced into engagement with a member of the engine to be started when the actuating means are operated, an inertia means cooperating with the actuating means, driving means for the inertia means, and means for predetermining the period of time of the advancement of the driving member before engaging the engine member said period varying in accordance with the speed of the inertia means, whereby the inertia means may be operated sufficiently before such engagement occurs, said driving member having the portion which engages the engine member movable for advancement independently of the remainder of such driving member, and means for controlling such portion to increase such period of time, said driving member comprising a body portion and a clutch portion mounted thereon for rotary movement therewith and longitudinal movement thereof, and a manually operated rod passing through such driving member and normally limiting the extent of separation of said two portions of the driving member and adapted to control the longitudinal movement of the clutch portion to increase such period of time.

6. In an engine starting apparatus, a drive including actuating means and a driving member adapted to be automatically advanced into engagement with a member of the engine to be started when the actuating means are operated, an inertia means cooperating with the actuating means, driving means for the inertia means, and means for predetermining the period of time of the advancement of the driving member before engaging the engine member in accordance with the speed of the actuating means, whereby the inertia means may be operated sufficiently before such engagement occurs, said driving member having the portion which engages the engine member movable for advancement independently of the remainder of such driving member, and means for controlling such portion to increase such period of time, said driving member comprising a body portion and a clutch portion mounted thereon for rotary movement therewith and longitudinal movement thereof, and a rod passing through such driving member and engaging such clutch member thereof to increase such period of time when actuated by the operator.

7. In an engine starting apparatus, a drive including a driving member adapted to be automatically advanced into engagement with a member of the engine to be started, and manually operated means for rotating the driving member to retract it to normal position.

8. In an engine starting apparatus, a drive including a driving member adapted to be automatically advanced into engagement with a member of the engine to be started, and manually operated means for rotating the driving member to retract it to normal position, said driving member having a clutch portion having a longitudinal movement independent thereof and adapted to engage the engine member, and a manually operated rod which engages said clutch portion to control its longitudinal movement and to rotate the entire driving member.

9. In an engine starting apparatus, a drive including a driving member adapted to be automatically advanced into engagement with a member of the engine to be started, and manually operated means for rotating the driving member to retract it to normal position, said driving member having a clutch portion having a longitudinal movement independent thereof and adapted to engage the engine member, and a manually operated rod which engages said clutch portion to control its longitudinal movement and to rotate the entire driving member, said rod passing longitudinally through the driving member and its clutch portion and at one end engaging such clutch portion.

10. In an engine starting apparatus, a drive including actuating means and a driving member adapted to be automatically advanced into engagement with a member of the engine to be started when the actuating means are operated, reduction means cooperating with the actuating means and including a main shaft in axial alinement with the driving member, means for driving the reduction means, and a manually operated rod passing longitudinally through said shaft and driving member and rotatively connected with the latter for withdrawing it from engagement with the engine member.

11. In a starter for internal combustion engines, a member adapted to move into driving engagement with a member of the engine to be started, a flywheel, means for storing energy in the flywheel, means for drivably connecting the flywheel and driving member, automatic means for moving the latter to driving position, and manually operable means for rendering the automatic means ineffective to move said first named member to driving position.

12. In an engine starting apparatus, a drive including actuating means and a driving member adapted to be automatically advanced into engagement with a member of the engine to be started when the actuating means are operated, manually operable means for restraining the automatic advance of said driving member for any desired period, and means for rapidly projecting said driving member into engagement with said engine member upon release of said restraining means.

13. In an engine starting apparatus, a drive including actuating means and a driving member adapted to be automatically advanced into engagement with a member of the engine to be started when the actuating means are operated, manually operable means for restraining the automatic advance of said driving member for any desired period, comprising a rod extending through said driving member and having a connection therewith for controlling the axial movement without interfering with the rotary movement thereof, and means associated with said rod for snapping said driving member into engagement with said engine member upon release of the manual restraint on said rod.

14. In an engine starting apparatus, a drive including actuating means and a driving member adapted to be automatically advanced into engagement with a member of the engine to be started when the actuating means are operated, manually operable means for restraining the automatic advance of said driving member for any desired period, comprising a rod extending through said driving member and having a connection therewith for controlling the axial movement without interfering with the rotary movement thereof, and means associated with said rod for snapping said driving member into engagement with said engine member upon release of the manual restraint on said rod, said last named means comprising a spring surrounding said rod and engageable with said driving member to urge the latter toward said engine member.

15. In an engine starting apparatus, a drive including actuating means, a driving member, an operating connection between said driving member and the actuating means for automatically advancing said driving member into engagement with a member of the engine to be started when said actuating means are operated, and means for restraining the rotation of the driving member during the period of its advancement, said restraining means comprising a member engageable with said driving member for rotation in unison therewith, and friction means for holding said member against rotation until it reaches the limit of its forward movement.

16. In an engine starting apparatus, a drive including actuating means, a driving member, an operating connection between said driving member and the actuating means for automatically advancing said driving member into engagement with a member of the engine to be started when said actuating means are operated, and means for restraining the rotation of the driving member during the period of its advancement, said restraining means comprising a splined member rotatable with said driving member but having frictional engagement with the starter casing to an extent sufficient to resist rotation thereof during its advancing movement, said spline member being rotatable in unison with said driving member thereafter.

17. In an engine starting apparatus, in combination with a rotatable inertia member having a relatively massive annular rim and a relatively light web integral with said rim, an engine engaging member, a gear train having a relatively low speed element operatively connected with said engaging member and a relatively high speed element operatively connected with said inertia member, means engageable with said web to energize said inertia member, and means for automatically advancing said engaging member toward engine engaging position at a rate sufficiently slow to insure a maximum degree of acceleration of said inertia member during completion of the engine engaging movement.

18. In an engine starting apparatus, in combination with a rotatable inertia member having a relatively massive annular rim and a relatively light web integral with said rim, an engine engaging member, a gear train having a relatively low speed element operatively connected with said engaging member and a relatively high speed element operatively connected with said inertia member, and means for automatically advancing said engaging member toward engine engaging position at a rate sufficiently slow to insure a maximum degree of acceleration of said inertia member during completion of the engine engaging movement.

19. In an engine starting apparatus, a drive including inertia means and a member movable into engine engaging position in response to rotation of the inertia means, motor driven means for energizing the inertia means, and means for delaying the completion of the engine engaging movement for a period of time which varies inversely with the speed of rotation of the inertia means, said delaying means including cooperating screw threads for controlling the transmission of the engine engaging movement, the inclination and speed of said threads being such as to permit storage in said inertia member, during the engaging movement, of an amount of energy sufficient for cranking purposes even without further energization from said motor driven means.

20. In an engine starting apparatus, a drive including inertia means and a member movable into engine engaging position in response to rotation of the inertia means, motor driven means for energizing the inertia means, and means for delaying the completion of the engine engaging movement for a period time which varies inversely with the speed of rotation of the inertia means, said delaying means including cooperating mesh producing elements for controlling the transmission of the engine engaging movement, the inclination and speed of said elements being such as to permit storage in said inertia member, during the engaging movement, of an amount of energy sufficient for cranking purposes even without further energization from said motor driven means.

21. In an engine starting apparatus of the inertia type, mesh producing means comprising a motion translating screw, the thread inclination and speed of which are such that the time required for meshing is so related to the velocity of the inertia member, as to insure a maximum inertia effect at the moment of completion of the meshing action.

22. In an engine starting apparatus of the inertia type, mesh producing means comprising a motion translating connection, the speed of which is such that the time required for meshing is so related to the velocity of the inertia member, as to insure a maximum inertia effect at the moment of completion of the meshing action.

RAYMOND P. LANSING.